(12) United States Patent
Zawade et al.

(10) Patent No.: US 9,140,047 B2
(45) Date of Patent: Sep. 22, 2015

(54) METHOD FOR LOWERING A WINDOW PANE

(71) Applicant: Volkswagen AG, Wolfsburg (DE)

(72) Inventors: Torsten Zawade, Peine (DE); Ralf Borngraeber, Lehre (DE); Michael Wistrach, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 13/925,089

(22) Filed: Jun. 24, 2013

(65) Prior Publication Data

US 2013/0283692 A1 Oct. 31, 2013

Related U.S. Application Data

(63) Continuation of application No. PCT/EP2011/006541, filed on Dec. 23, 2011.

(30) Foreign Application Priority Data

Dec. 24, 2010 (DE) .................. 10 2010 056 226

(51) Int. Cl.
*E05F 15/00* (2015.01)
*E05F 15/20* (2006.01)
*B60R 21/015* (2006.01)
*E05F 15/695* (2015.01)
*E05F 15/70* (2015.01)

(52) U.S. Cl.
CPC ............ *E05F 15/20* (2013.01); *B60R 21/01546* (2014.10); *E05F 15/695* (2015.01); *E05F 15/70* (2015.01); *E05Y 2400/358* (2013.01); *E05Y 2400/44* (2013.01); *E05Y 2900/508* (2013.01); *E05Y 2900/531* (2013.01); *E05Y 2900/55* (2013.01)

(58) Field of Classification Search
USPC .......... 49/348, 349, 506; 180/268; 296/146.2, 296/146.16
IPC ................... E05F 11/382,15/73, 15/695, 15/20, E05F 15/70; B60R 21/01546; E05Y 2400/44, E05Y 2900/55, 2900/531, 2400/358, 2900/508
See application file for complete search history.

(56) References Cited

U.S. PATENT DOCUMENTS

| | | | | |
|---|---|---|---|---|
| 4,571,884 | A * | 2/1986 | Hetmann et al. | 49/72 |
| 6,288,506 | B1 * | 9/2001 | Hiwatari | 318/283 |
| 6,472,836 | B1 * | 10/2002 | Uebelein et al. | 318/445 |
| 2004/0002801 | A1 * | 1/2004 | Ide et al. | 701/45 |
| 2007/0285218 | A1 * | 12/2007 | Fletcher et al. | 340/457 |
| 2008/0141505 | A1 * | 6/2008 | Borst | 24/603 |
| 2011/0314737 | A1 * | 12/2011 | Schindhelm et al. | 49/31 |

(Continued)

FOREIGN PATENT DOCUMENTS

| | | |
|---|---|---|
| DE | 198 36 761 C1 | 7/1999 |
| DE | 103 38 767 A1 | 3/2005 |
| DE | 600 15 015 T2 | 3/2006 |
| DE | 10 2006 049 223 A1 | 4/2008 |

(Continued)

*Primary Examiner* — Gregory Strimbu
(74) *Attorney, Agent, or Firm* — Muncy, Geissler, Olds & Lowe, P.C.

(57) ABSTRACT

A method for lowering a window pane includes lowering the window pane from the starting position by a defined distance by a window lifter in a motor vehicle door after a state signal is received. The state signal is triggered by the actuation of a seatbelt buckle. By using the seatbelt buckle for the purposes of emitting the signal, the window pane is lowered by the defined distance only if the motor vehicle operator or one of motor vehicle occupants is expected to exit the motor vehicle.

10 Claims, 1 Drawing Sheet

(56) References Cited

U.S. PATENT DOCUMENTS

2012/0136532 A1* 5/2012 Konchan .................... 701/36
2013/0055642 A1* 3/2013 Patterson .................... 49/349

FOREIGN PATENT DOCUMENTS

| DE | 10 2008 014 520 A1 | 11/2008 |
| DE | 10 2007 025 517 A1 | 12/2008 |

* cited by examiner

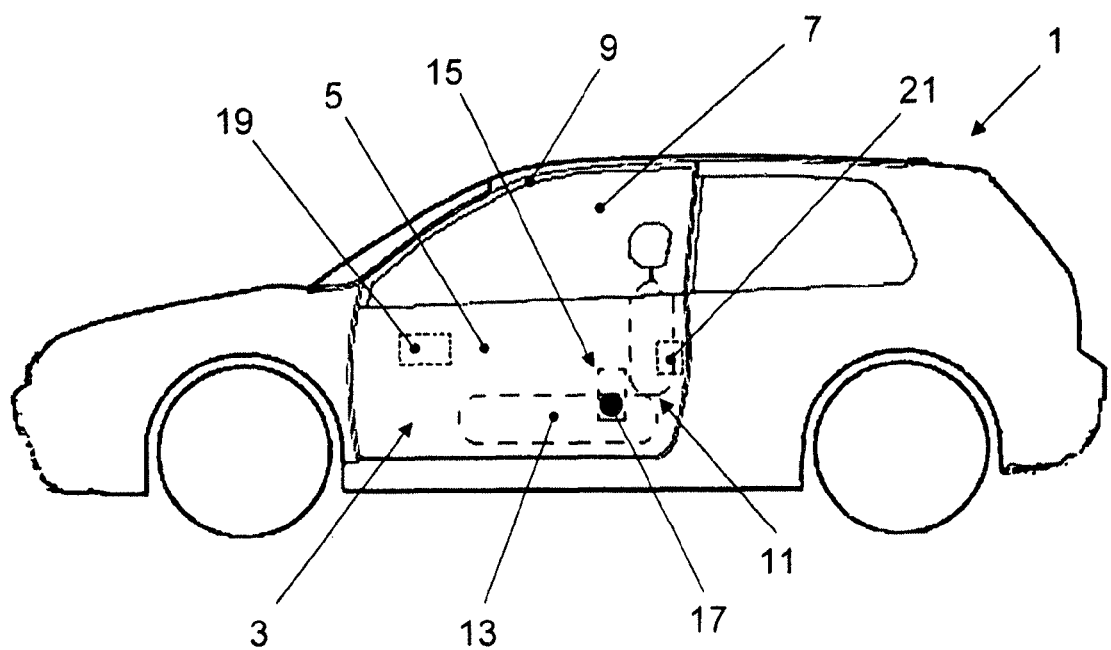

METHOD FOR LOWERING A WINDOW PANE

This nonprovisional application is a continuation of International Application No. PCT/EP2011/006541, which was filed on Dec. 23, 2011, and which claims priority to German Patent Application No. DE 10 2010 056 226.2, which was filed in Germany on Dec. 24, 2010, and which are both herein incorporated by reference.

BACKGROUND OF THE INVENTION

1. Field of the Invention

The invention relates to a method for lowering a window pane and a motor vehicle.

2. Description of the Background Art

Methods and devices for lowering a window pane are known from the conventional art. These methods and devices solve a problem that occurs in frameless motor vehicle doors in which the window pane is not located in a door frame belonging to the vehicle door. In these frameless motor vehicle doors, sealing problems can arise in the region of the top edge of the door window panes in the closed state, since the window pane must work together with a seal in this region. With conventional motor vehicle doors, this seal is already arranged on a frame of the motor vehicle door. With frameless motor vehicle doors, however, this seal is located on the motor vehicle body, so that after closing of the door the window pane must move into the seal located on the motor vehicle body in order to tightly seal the window pane. To this end, the window pane must be moved a certain distance out of the region of the seal located on the motor vehicle body before the motor vehicle door is closed or opened. In the prior art, this movement, which is also called short-stroke lowering, is triggered by various events.

Thus, DE 103 38 767 A1 discloses a door window control system for motor vehicle doors, and a window pane that can be raised and lowered by means of a motor, and an actuating element, in particular a door handle, for opening and closing the motor vehicle doors, wherein the window pane is opened by a short stroke each time the door is opened. According to the invention, at least one proximity sensor is provided, and/or at least one touch-sensitive sensor is arranged in the region of the actuating element. When an operator approaches the actuating element or the actuating element is touched by the operator, the touch-sensitive sensor issues a short stroke request signal.

In addition, a vehicle door with a window is known from DE 10 2008 014 520 A1 that can be lowered by a window regulator in a door body. During an opening process of the vehicle door, a defined lowering of the vehicle window pane from an initial position by a short-stroke travel can be carried out. According to the disclosure, the lowering can be triggered by means of an advance sensor of an electronic access control system.

Furthermore, it is known in modern motor vehicles that the signal for triggering a short stroke of window panes is issued when an ignition key is removed from an ignition lock of a motor vehicle. By this behavior, the operator signals that he intends to exit the motor vehicle shortly. In the most modern motor vehicles, which are equipped with electronic access control systems, an ignition lock for operating the motor vehicle may not be present. Motor vehicles of this type are provided with a so-called start/stop button, with which the engine can be started and stopped. For motor vehicles of this type, but not only of this type, it is necessary to provide another option for issuing a signal to a window regulator device.

SUMMARY OF THE INVENTION

It is therefore an object of the invention to provide an improved method for lowering a window pane, and to create an improved motor vehicle with a seat belt buckle and a motor vehicle door. This object is attained by a method for lowering a window pane in accordance with an embodiment, and by a motor vehicle with a seat belt buckle and a motor vehicle door.

According to an embodiment of the invention, a method is proposed for lowering a window pane that is lowered by a defined distance from an initial position by means of a window regulator in a motor vehicle door body after the arrival of a status signal. The status signal here is triggered by the actuation of a seat belt buckle. Because the seat belt buckle is used for the purpose of issuing a signal, the result is advantageously achieved that the window pane is lowered by a defined distance only when the motor vehicle operator or other motor vehicle occupant intends with high probability to exit the motor vehicle. In this context, each seat belt buckle can issue a signal for the window pane that is closest to the seat belt buckle, so that only the window pane closest to the seat belt buckle is lowered. It is also possible for all window panes to be lowered by the short-stroke travel when the engine is turned off and the seat belt buckle of the driver's seat issues an "opened" status signal. In connection with the invention, window panes can be understood to mean, in particular, side window panes that can be lowered in a motor vehicle door body, which is to say the part of a motor vehicle door that is pivotably arranged on a motor vehicle body and laterally delimits access to the motor vehicle passenger compartment. According to the invention, the defined distance that extends from an initial position to a lowered position should be dimensioned such that the top edge of the window pane has a contact-free spacing to a sealing element arranged on a motor vehicle body. In preferred fashion, this spacing measures 4 mm. The distance that the window pane travels from the initial position to the lowered position should be in the range from 8 mm to 30 mm. In connection with the invention, actuation of a seat belt buckle can be understood to mean the release of a seat belt tongue from the seat belt buckle as a result of the actuation of an actuating element of the seat belt buckle, in particular a pushbutton element.

In an embodiment of the invention, the status signal is transmitted to a control unit. This measure provides the advantage that multiple status signals can be processed in one control unit and a control signal can be issued as a function of the relationships of the status signals to one another. Thus, for example, it would be possible for the status signals of an opened seat belt buckle and, for example, a door locked by a child safety device to be sent to the control unit. In this case the control unit would not initiate the short-stroke lowering with a control signal. Moreover, it is possible for the control unit to send a control signal to the window regulator. This control signal can also be sent indirectly to the window regulator, so that the regulator is moved as a function of the control signal. The control signal can also contribute to unloading the vehicle components responsible for raising the window pane, such as the window regulator for example, before the short-stroke lowering. This measure achieves the result that the short-stroke lowering can proceed rapidly and with little expenditure of energy. In connection with the invention, a control signal is understood to mean a signal issued by the control unit to other vehicle components after the processing of the incoming status signals.

In an embodiment of the invention, the window regulator can be moved as a function of the control signal of the control unit. By this means, it is possible for the window regulator to be moved at least indirectly as a function of the status signals processed by the control unit, and to only be activated when a motion or a short-stroke lowering is desired as a function of the different status signals.

According to an embodiment of the invention, moreover, there is provided a motor vehicle having a seat belt buckle and a motor vehicle door with a window pane that can be lowered by a defined distance from an initial position by means of a window regulator in a motor vehicle door body. In this context, the seat belt buckle has means that are suitable for at least indirectly influencing the lowering of the window pane. As a result of these measures according to the invention, a motor vehicle is provided that advantageously uses the vehicle component of the seat belt buckle in order to at least indirectly initiate the short-stroke lowering of the window pane. This offers the advantage that components that are present in the motor vehicle in any case are used for the short-stroke lowering. This measure saves additional vehicle components.

According to an embodiment of the invention, a sensor or switching element can be arranged on the seat belt buckle. In this case, the sensor can be designed as a capacitive sensor in order to determine the position of a seat belt tongue in the seat belt buckle. This measure makes it possible for the state of the seat belt buckle to be reliably sensed. In a preferred embodiment of the invention, the switching element is designed as a contact switch. In connection with the invention, a contact switch is understood to mean any assembly that can establish or interrupt an electrically conductive connection by means of two electrically conductive materials or a semiconductor component. Because of the arrangement of a contact switch, a means is advantageously made available that is suitable for reliably ascertaining the state of the seat belt buckle. The contact switch can be designed as a microswitch here. A microswitch is to be understood to mean an electrical switch whose contacts have only a small spacing from one another, preferably less than 3 mm, in the opened state.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawing which is given by way of illustration only, and thus, is not limitive of the present invention, and wherein the sole FIGURE illustrates a schematic representation of a motor vehicle with a vehicle door and a window pane.

DETAILED DESCRIPTION

The invention is explained below using an exemplary embodiment in conjunction with the single drawing. The FIGURE shows a schematic representation of a motor vehicle 1 with a vehicle door 3 and a window pane 7 that can be lowered into a motor vehicle door body 5. The window pane 7 rests in a sealing element 9 in the closed state and must be lowered out of the sealing element 9 by a short-stroke travel when the vehicle door 3 is opened or closed. The vehicle door 3 is of a frameless design, so that the sealing element 9 is arranged on the motor vehicle body. In order to at least indirectly influence the lowering of the window pane 7, the motor vehicle 1 has a seat belt buckle 15 in the region of a motor vehicle seat 11, and in the rear region of a motor vehicle seat surface 13 there viewed in the direction of travel. The seat belt buckle 15 has a microswitch 17 that is suitable for at least indirectly transmitting a status signal to a control unit 19. As soon as the microswitch 17 is opened and a status signal for the seat belt buckle 15 generates the status "seat belt buckle open," which is to say that a seat belt tongue that is not shown here of a seat belt that is not shown here has been moved out of the seat belt buckle 15, the opened status is reported to the control unit 19. In this case, the control unit 19 transmits a control signal to a window regulator 21, which lowers the window pane 7 out of the sealing element 9 by a predefined distance. The window regulator 21 here comprises motor components that are suitable for automatically lowering the window pane 7. Once the short-stroke lowering has taken place, the control unit 19 waits for a signal that indicates that the vehicle door 3 has been opened and closed before moving the window pane into the closed position in which it rests in the sealing element 9, or else automatically travels to this position after expiration of a time interval.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for lowering window panes, the method comprising:
    detecting a first status signal;
    lowering one of the window panes by a defined distance from an initial position via a window regulator in a motor vehicle door after said detecting the first status signal, the first status signal being triggered by an actuation of a seat belt buckle, the defined distance is dimensioned such that a top edge of the one of the window panes has a contact-free spacing from a sealing element arranged on a motor vehicle;
    detecting a second status signal indicating that the vehicle door has been opened and closed; and
    raising the one of the window panes until the one of the window panes rests within the sealing element,
    wherein the one of the window panes is closest to the seat belt buckle such that only the one of the window panes closest to the seat belt buckle is lowered.

2. The method according to claim 1, wherein the first status signal and the second status signal are transmitted to a control unit.

3. The method according to claim 2, wherein the control unit is adapted to send a control signal to the window regulator.

4. The method according to claim 3, wherein the window regulator is moved in response to the control signal of the control unit.

5. The method according to claim 1, wherein said actuation of a seat belt buckle comprises a release of a seat belt tongue from the seat belt buckle as a result of an actuation of an actuating element of the seat belt buckle.

6. A motor vehicle, comprising:

a plurality of vehicle doors a plurality of sealing elements;

a plurality of seat belt buckles; and a plurality of window panes arranged in the plurality of vehicle doors, wherein each of the plurality of window panes is adapted to be automatically lowered by a defined distance from an initial position by a window regulator in a corresponding one of the vehicle doors when a corresponding one of the plurality of seat belt buckles that is closest to a corresponding one of the window panes is released such that only the corresponding one of the window panes closest to the corresponding one of the plurality of seat belt buckles that has issued a fastening status signal is lowered, wherein the defined distance is dimensioned such that a top edge of each of the window panes has a contact-free spacing with respect to a corresponding one of the sealing elements, and wherein each of the window panes is adapted to be raised until the window pane rests within the corresponding one of the sealing elements after a signal is detected indicating that the corresponding one of the vehicle doors has been opened and closed.

7. The motor vehicle according to claim 6, wherein each of the seat belt buckles includes a switching element.

8. The motor vehicle according to claim 7, wherein each of the switching elements is a contact switch.

9. The motor vehicle according to claim 7, wherein each of the switching elements is a microswitch.

10. The motor vehicle according to claim 6, wherein each of the seat belt buckles includes a sensor.

* * * * *